US012806997B2

(12) United States Patent
Bauernfeind et al.

(10) Patent No.: US 12,806,997 B2
(45) Date of Patent: Nov. 24, 2026

(54) METHOD AND APPARATUS FOR OPERATING SMART GLASSES IN A VEHICLE

(71) Applicant: Bayerische Motoren Werke Aktiengesellschaft, Munich (DE)

(72) Inventors: Tobias Bauernfeind, Munich (DE); Wolfgang Haberl, Munich (DE); Alan Keim, Hallbergmoos (DE); Manfred Pauli, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/039,732

(22) Filed: Jan. 28, 2025

(65) Prior Publication Data

US 2025/0256573 A1 Aug. 14, 2025

(30) Foreign Application Priority Data

Feb. 8, 2024 (DE) ..................... 10 2024 103 481.5

(51) Int. Cl.
*B60K 35/234* (2024.01)
*B60K 35/28* (2024.01)

(52) U.S. Cl.
CPC .......... *B60K 35/234* (2024.01); *B60K 35/285* (2024.01); *B60K 2360/589* (2024.01)

(58) Field of Classification Search
CPC ............ G02B 27/017; G02B 2027/014; G02B 2027/0178; G06F 3/011; G06F 3/012; G06F 3/013; G06T 19/20; G06T 3/18; G06T 2219/2016; B60K 35/234; B60K 35/285; B60K 2360/177; B60K 2360/589
See application file for complete search history.

(56) References Cited

U.S. PATENT DOCUMENTS

| | | | | |
|---|---|---|---|---|
| 11,256,931 | B2 | 2/2022 | Herrmann et al. | |
| 2017/0115730 | A1 * | 4/2017 | Knebel | G06F 3/012 |
| 2017/0178359 | A1 * | 6/2017 | Spiessl | B60K 35/28 |
| 2017/0249789 | A1 * | 8/2017 | Mizuno | G07C 5/0858 |

(Continued)

FOREIGN PATENT DOCUMENTS

| | | | |
|---|---|---|---|
| DE | 10 2012 022 485 | A1 | 8/2013 |
| DE | 10 2015 206 477 | A1 | 10/2016 |

(Continued)

OTHER PUBLICATIONS

WO 2015071035 A1 (Year: 2015).*

(Continued)

*Primary Examiner* — Nelson M Rosario
(74) *Attorney, Agent, or Firm* — Crowell & Moring LLP

(57) ABSTRACT

A method for operating a display system for smart glasses in a vehicle includes determining at least one environment region that is intended to be blurred at a position relative to an environment coordinate system or a vehicle coordinate system. Object information is generated for transmission to the smart glasses. The object information defines a display object as a blur object of the determined at least one environment region and defines the position of the at least one blurred environment region in order to superimpose the display object on the at least one environment region to be blurred within the perception region of the wearer of the smart glasses.

12 Claims, 3 Drawing Sheets

(56) References Cited

U.S. PATENT DOCUMENTS

| | | | | |
|---|---|---|---|---|
| 2018/0040103 | A1 | 2/2018 | Esparza Garcia et al. | |
| 2021/0170957 | A1* | 6/2021 | Sato | B60R 11/0229 |
| 2023/0298222 | A1* | 9/2023 | Zarichnyi | G06T 7/11 |

FOREIGN PATENT DOCUMENTS

| | | | | |
|---|---|---|---|---|
| DE | 10 2016 225 267 A1 | | 6/2018 | |
| DE | 10 2021 205 700 A1 | | 12/2022 | |
| WO | WO-2015071035 A1 | * | 5/2015 | B60W 60/0053 |

OTHER PUBLICATIONS

German-language Search Report issued in German Application No. 10 2024 103 481.5 dated Aug. 28, 2024 with partial English translation (12 pages).

* cited by examiner

METHOD AND APPARATUS FOR OPERATING SMART GLASSES IN A VEHICLE

CROSS REFERENCE TO RELATED APPLICATION

This application claims priority under 35 U.S.C. § 119 from German Patent Application No. DE 10 2024 103 481.5, filed Feb. 8, 2024, the entire disclosure of which is herein expressly incorporated by reference.

BACKGROUND AND SUMMARY

The invention generally relates to that may be used in a vehicle. The invention also generally relates to a method for operating a display system that can be used to indicate environment objects to a driver.

It has been known in the past when using smart glasses to mark or highlight specific objects in the real environment by displaying a symbol that represents a border of the object of interest or hatching on the object of interest. Thus, an environment object can be efficiently indicated to a wearer of smart glasses.

When moving the smart glasses when changing the pose, the corresponding marking symbol is displayed in the smart glasses in a contact-analog manner, with the result that the marking is always above the real position of the environment object of interest. This reliably keeps the object of interest marked when the wearer of the smart glasses moves.

However, this type of marking is a significant intervention in the visual perception of the wearer of the smart glasses, since the augmented image perceived by the wearer of the smart glasses is significantly dominated by the marking object.

It is therefore an objective of the present invention to provide an improved method for operating smart glasses, in which an environment object can be intuitively highlighted. At least this objective is achieved by the systems and methods described and claimed herein. Other objectives will be apparent to those of ordinary skill in the art from the disclosure.

In at least one embodiment, a method for operating a display system for smart glasses in a vehicle comprises: determining at least one environment region that is intended to be blurred at a position relative to an environment coordinate system or a vehicle coordinate system; and generating object information for transmission to the smart glasses, wherein the object information defines a blur image in the at least one environment region and the position of the at least one environment region in order to carry out blurring within the at least one environment region within the perception region of the wearer of the smart glasses.

The at least one environment region may be a region that at least partially surrounds an environment object to be highlighted. The environment object to be highlighted can be identified and located by means of an environment capture system.

The at least one environment region may comprise a predefined display region which is intended to be used to present display information. Thus, the blur effect can be used to blur a specific, for example rectangular, environment region and to present clear, non-blurred information above it, such as text, symbols or the like. As a result, information presented in this way is more perceptible than information presented directly above the real environment.

The blurred environment region is generated by means of a recorded image (live video image) of the specific environment region which is modified by a graphics filter. The graphics filter can apply sharpness, structure and color, as well as other known image effects to the image of the environment region. Since the blurred environment region is closer to the viewer's eye thanks to the glasses display and is displayed in the same visual axis as the specific environment region, it covers the specific environment region. If necessary, the brightness of the blurred environment region can also be increased to increase the concealment of the specific environment region.

The object information may be received in the smart glasses in order to present a display object in the form of a blurred environment region in the smart glasses in a contact-analog manner, thus generating, within the environment region that is covered by the display object and is within a perception region of the wearer of the smart glasses, the impression of a blurring of the real environment that is superimposed or augmented with the display object.

The perception region corresponds to that section of the environment region that is perceived by the wearer of the smart glasses through the lenses of the smart glasses on the basis of the current pose of the head of the wearer of the smart glasses.

One possible way of highlighting environment objects may involve making the objects of no interest or regions of the field of view more inconspicuous for perception using a blur effect, such as a so-called frosted glass effect. The blur effect or frosted glass effect makes the perception of an image region distorted or blurred, as if it were viewed through a diffusely transparent or translucent pane.

Up to now, a blurred environment region or a blur object for the environment region or environment objects that can be viewed through smart glasses has/have not been realized. This is at least because the blur effect has hitherto only been able to be calculated and displayed for purely virtual objects. A blur effect can conventionally be created using 3D design software. This is possible for still images and also for video applications using graphics engines such as Unity® and Unreal®. These graphics engines can calculate the effect at runtime, and, if the object moves, i.e. the orientation, position and distance change, the blur effect also represents this change.

According to the disclosed embodiments, the blur effect can be used to highlight real environment objects or environment regions and put them into the background. The blur effect can be performed with smart glasses by adding pixels in the edge region of the perception region (image region of the perception of the environment region by the eye) of the environment object and within the perception area of the specific environment region through the smart glasses, by means of which the perception of structures in the image of the specific environment region and the outer contour of the environment region are blurred. For this purpose, it is first necessary to determine the exact position of the environment object in the glasses-fixed (or possibly world-fixed) coordinate system.

In the same way as a marking object which appropriately marks an environment object or an environment region by hatching or framing, a display object can now be provided for display on a display surface of the smart glasses, which display object blurs a specific environment region outside the environment object to be highlighted by way of the blur effect, with the result that the relevant environment object or the relevant environment region is highlighted by virtue of being clearly perceptible, i.e. not blurred, and a perception region adjacent to the environment object being completely or partially blurred.

In this way, environment regions that lie outside the perception region blurred using the blur effect can be perceived sharply in the previous manner and can thus be highlighted, while the remaining environment region, for example the remaining region of the perception region, is perceived only in blurred form.

In some embodiments, the blur effect may be applied only when the vehicle is at a standstill in order to thus avoid preventing the perception of driving-related and vehicle-related information. For example, a driver driving to a navigation destination (specific environment object) and stopping shortly before it can be provided with a display of the navigation destination, if it is in the driver's perception region, marked in such a way that the environment region outside the navigation destination is blurred in the field of view using the blur effect.

Furthermore, the blur effect can be used to blur a specific, for example rectangular, region and to present clear, non-blurred information in it, such as text, symbols or the like. As a result, information presented in this way is more perceptible than information presented directly above the real environment.

In at least one embodiment, an apparatus (e.g., a vehicle assistance system) for operating a display system for smart glasses in a vehicle may be configured to: determine at least one environment region that is intended to be blurred at a position relative to an environment coordinate system or a vehicle coordinate system; generate object information that defines a display object as a blur object of the determined at least one environment region and defines the position of the at least one blurred environment region in order to superimpose the display object on the at least one environment region to be blurred within the perception region of the wearer of the smart glasses; and transmit the display object to the smart glasses.

In at least one embodiment, a display system having the above apparatus and smart glasses may be configured to display the display object in a contact-analog manner on the basis of a pose of the head of the wearer of the smart glasses.

At least one embodiment is explained in more detail below with reference to the accompanying drawings. Other objects, advantages and novel features of the present invention will become apparent from the following detailed description in conjunction with the accompanying drawings.

DETAILED DESCRIPTION OF THE DRAWINGS

Figure 1:
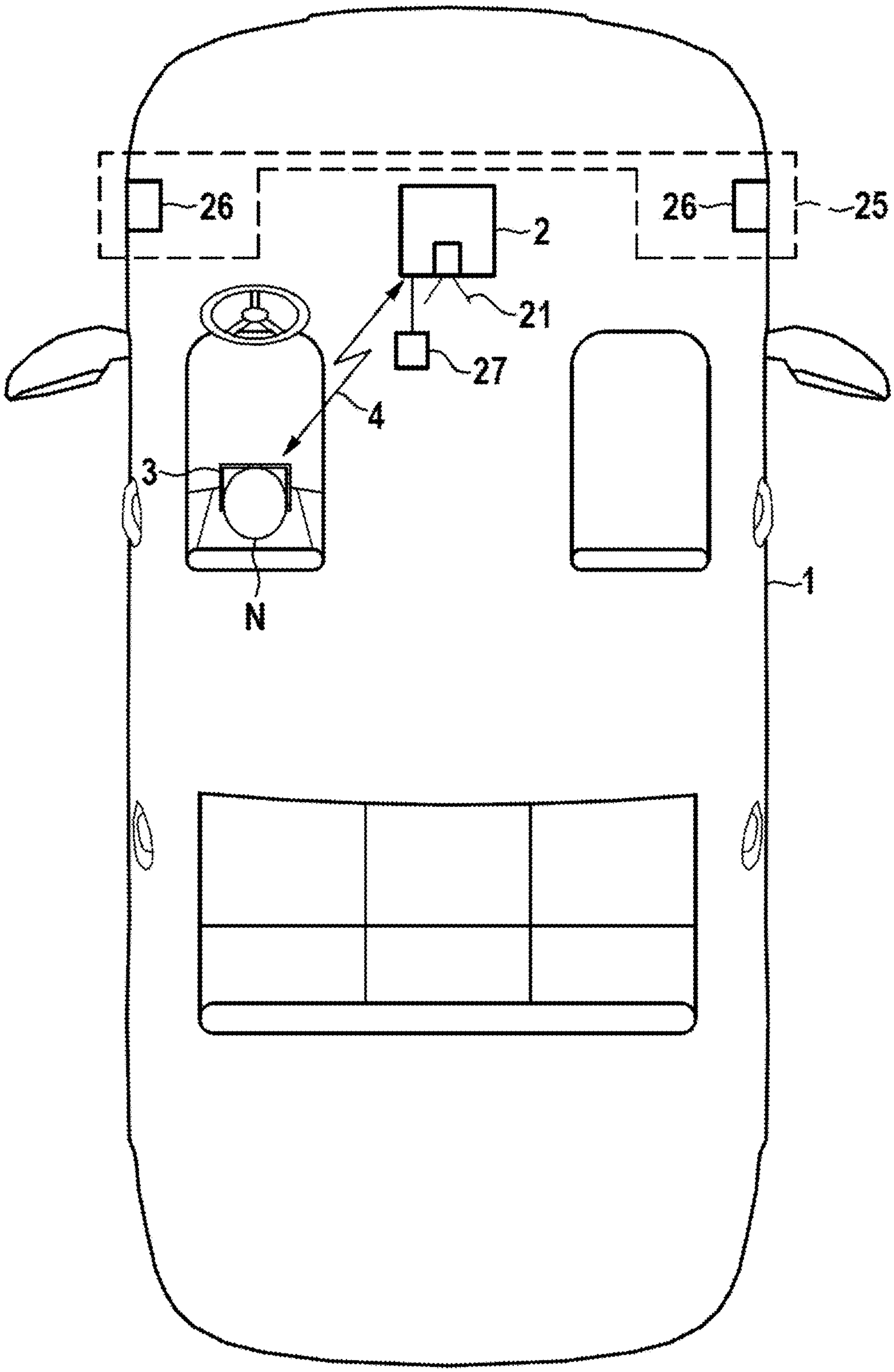
FIG. 1 shows a display system in a vehicle having smart glasses.

FIG. 1 schematically shows a vehicle having a vehicle assistance system in which functions for operating smart glasses in the vehicle are implemented.

FIG. 1 schematically shows a plan view of a display system in a vehicle 1, in which a vehicle occupant N wears smart glasses 3. The smart glasses 3 are connected to a vehicle-fixed assistance system 2 via a communication connection 4. The communication connection 4 is designed as a data transmission channel, for example in the form of a wireless or a wired communication connection. The communication connection 4 is able to communicate any kind of data and information between the assistance system 2 and the smart glasses 3, for example on the basis of a packet-mode data transmission. For example, the communication connection 4 may be based on Wi-Fi, Bluetooth, Bluetooth Low Energy, or a comparable standardized radio protocol.

Figure 2:
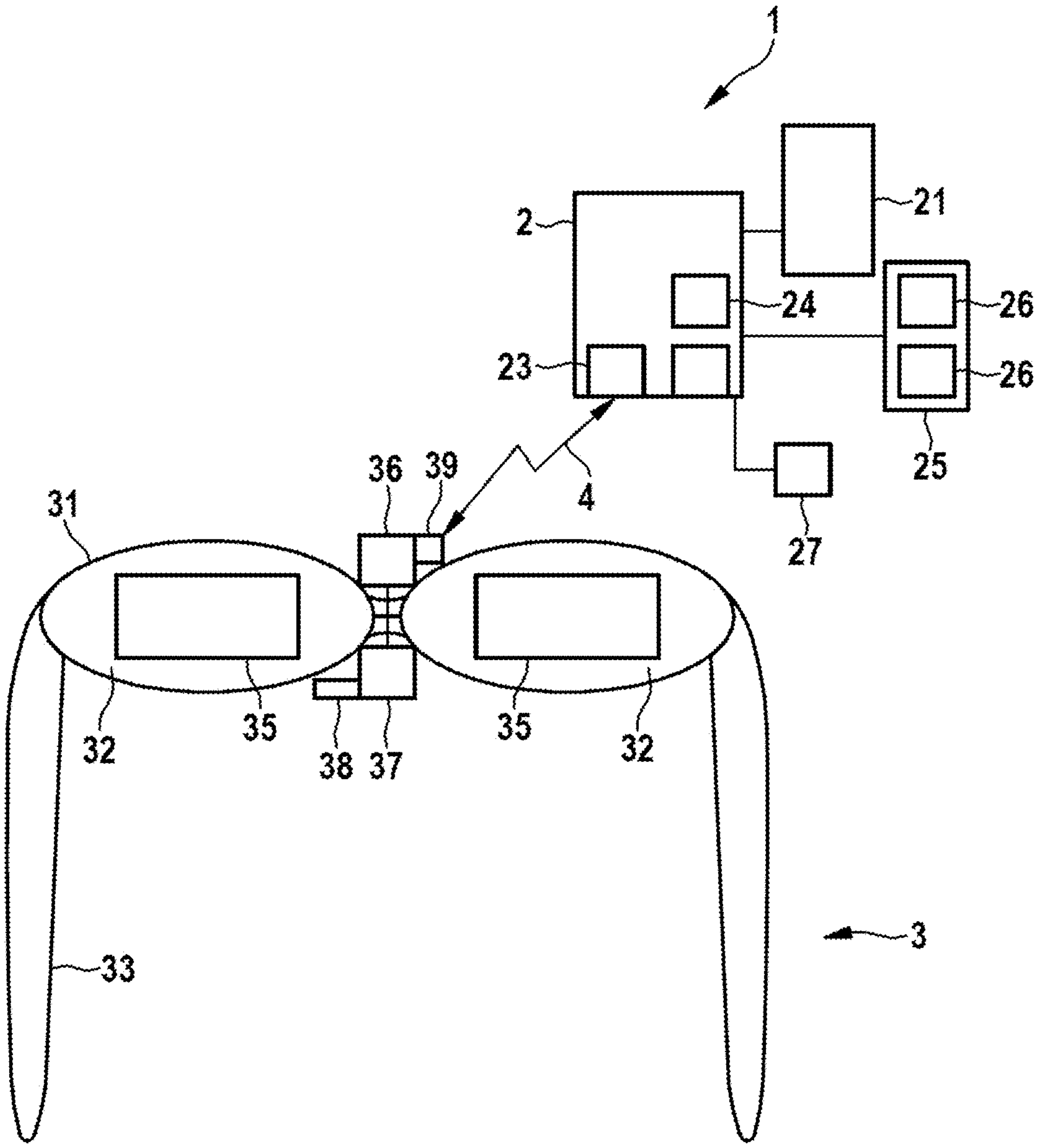
FIG. 2 shows a schematic detailed illustration of a display system having smart glasses for a vehicle.

FIG. 2 shows a more detailed illustration of the display system.

The vehicle assistance system 2 may be provided in the vehicle 1. In particular, the vehicle assistance system 2 may be provided in a positionally fixed fashion. The vehicle assistance system 2 may be equipped with a communication unit 23 enabling the data to be transmitted between the smart glasses 3 and the vehicle assistance system 2 via the communication connection 4.

An interior camera 21 is used to continuously capture the interior of the vehicle in order to provide a camera image of a vehicle interior. The interior camera 21 may comprise, for example, an RGB camera, an IR camera, a fisheye camera, a dynamic vision sensor and the like.

The vehicle assistance system 2 may have a control unit 24 in order to evaluate the camera image using a pattern recognition method or a vision tracking method and to determine therefrom a vehicle-fixed (based on the vehicle coordinate system) glasses pose indication of the smart glasses 3 in the vehicle. The vehicle-fixed glasses pose indication represents an absolute glasses pose relative to the vehicle-fixed vehicle coordinate system. By locating the vehicle 1 in the environment, i.e. by determining the pose of the vehicle, a world-fixed glasses pose indication can be determined in a manner known per se and represents an absolute glasses pose relative to the world-fixed environment coordinate system.

The vehicle-fixed and/or the world-fixed glasses pose indication can be used, after transmission to the smart glasses 3, there by means of sensor data fusion methods to generate a glasses pose indication inside the glasses which can be used in the smart glasses 3 for a contact-analog display of display objects.

The control unit 24 may also be connected to an environment capture system 25 comprising one or more environment cameras 26, one or more lidar sensors and/or one or more radar sensors for capturing objects in the vehicle environment. Based on sensor data captured with the environment capture system, environment objects in the vehicle environment can be identified and located using suitable object recognition methods implemented in the control unit 4. This means that object contours, object structures and the object position in the vehicle environment can be determined.

In addition, information about vehicle structures, which are arranged in the vehicle and whose position and contour can be specified accordingly, is available in the vehicle assistance system 2. The position and contour of the vehicle structures indicate what the driver sees when the driver's field of view is directed to the corresponding vehicle structure. Such vehicle structures may include, for example, the dashboard, the A-pillar and B-pillar, the roof liner, the center console or the like.

The smart glasses 3 comprise two transparent lenses 32 that are enclosed in a frame 31 in a manner known per se. The frame 31 is provided, by way of example, with glasses temples 33, so that the smart glasses 3 are able to be worn on the head of a user.

One or both lenses 32 (glasses lenses) are furthermore provided with a transparent display surface 35, through which a display image for presenting virtual display objects is able to be projected in the eye of the wearer of the smart glasses 3 by a suitable device, such as for example a display device 36 arranged on the frame 31. The display device 36 may have a microprocessor or a comparable computing unit and a display unit, such as for example a projection device or the like. The display unit may be designed to direct the electronically generated display image onto the display surface 35 and to image/present it there.

Owing to the transparent design of the display surface 35, the electronically generated image is able to overlay the real environment perceptible through the display surface 35. The display device 36 may be used to present a virtual display object, such as for example text, a symbol, media content, such as image information or video information, a graphic or the like, on one or both display surfaces 35.

The smart glasses 3 may be worn on the head of the user like a typical visual aid, wherein the smart glasses 3 may rest on the nose of the user by way of the frame 31 and the temples 33 may lie laterally against the head of the user. The viewing direction of the user straight ahead is then effected through the transparent display surfaces 35 of the lenses 32, such that the viewing direction and position of the user, specified by an eye position and an optical visual axis (eye axis), have a fixed reference with respect to the position and orientation of the smart glasses 3, i.e. the glasses pose.

For the display of display objects, corresponding object information in the form of object data is transmitted from the assistance system 2 to the smart glasses 3 or is already provided in the smart glasses 3. The object data indicate the type of display object, such as a text object, an icon, a symbol or other type of presentation of a display object, and the object position in a vehicle coordinate system.

The smart glasses may further comprise a glasses motion sensor system 38 (IMU sensor system, inertial sensor system) that is designed for example in the form of a 6-DoF inertial sensor. This provides relative or differential glasses movement information in relation to a movement of the smart glasses 3 in the form of translational accelerations and angular accelerations or angular speeds, which may be converted, in particular by a respective (inter alia double) integration, into a change in position and orientation, that is to say a differential glasses pose, such that it is possible to indicate an absolute glasses pose inside the glasses at high frequency by applying a time integration method. The vehicle-fixed or world-fixed glasses pose indication determined by means of the interior camera 21 can be transferred for sensor data fusion to the smart glasses 3 and used there to compensate for integration errors of the glasses pose indication determined in the smart glasses 3 on the basis of the differential glasses movement information, in order to obtain a glasses pose indication inside the glasses.

The relative or differential glasses movement information in the form of changes in position and orientation ascertained via the glasses motion sensor system 38 can be used, in a manner known per se, to determine a vehicle-fixed glasses pose indication for a current glasses pose of the smart glasses 3. In order to determine a vehicle-fixed glasses pose indication inside the glasses, the glasses movement information must be adjusted depending on the vehicle movement information (also relative or differential), such that only the movement of the smart glasses 3 in the vehicle can be evaluated. In this case, the difference in movement between the movement of the smart glasses 3 and the movement of the vehicle in the environment is ascertained and evaluated for the purpose of ascertaining the vehicle-fixed glasses pose indication.

With the aid of a control unit 37, object information, for example, can be received via a communication device 39 from the vehicle assistance system 2 or can be provided and processed in another manner such that this information is displayed in a contact-analog manner depending on the vehicle-fixed or world-fixed glasses pose indication inside the glasses with respect to the vehicle coordinate system or the environment coordinate system. In other words, the display object indicated by the object information is displayed on the display surface 35 if its associated position is in the viewing angle range of the wearer of the smart glasses 3.

The user N of the smart glasses 3 is located as an occupant in the vehicle 1, and the glasses pose of the smart glasses 3 can change by virtue of head movements and a movement of the vehicle. This glasses pose is determined continuously and in real time relative to the vehicle coordinate system and/or relative to the environment coordinate system by means of the sensor system described above in a manner known per se. For the contact-analog presentation of a display object relative to a vehicle-fixed environment position (indicated in the vehicle coordinate system) or relative to a world-fixed environment position (indicated in the environment coordinate system), i.e. the corresponding object information is provided with an environment position, on the display surface of the smart glasses 3, an absolute glasses pose indication relative to the vehicle-fixed coordinate system or relative to the world-fixed coordinate system must be available in the smart glasses 3.

A method is implemented in the vehicle assistance system 2 in order to alert a driver wearing smart glasses 3 to specific environment regions or environment objects identified by the object recognition method and thus to provide assistance in navigating or locating environment regions or environment objects or highlighting specific environment objects, such as a charging station.

Figure 3:
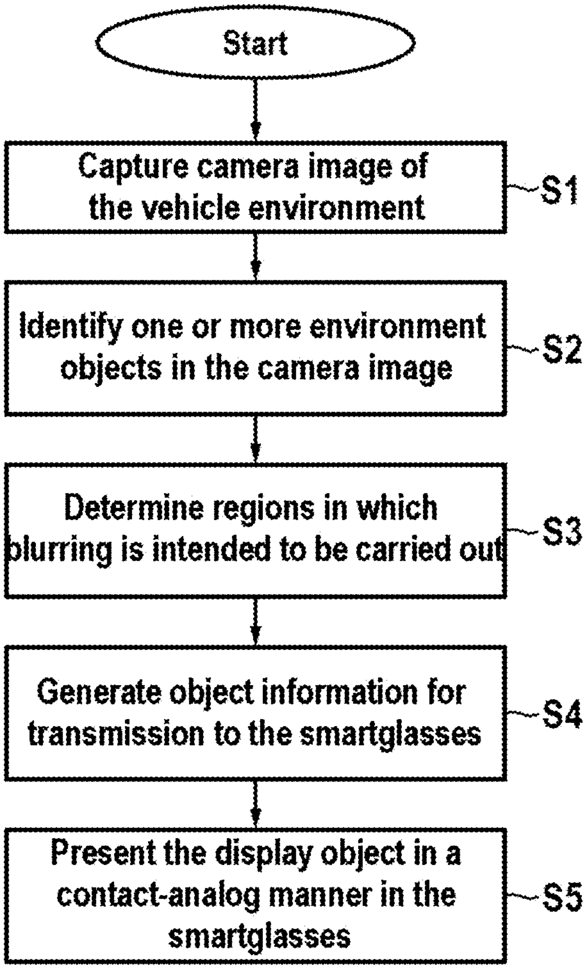
FIG. 3 shows a flowchart for illustrating a method for operating a display system in a vehicle having smart glasses.

In FIG. 3, a method for operating the display system with the smart glasses 3 is described in more detail by means of a flowchart. The method may be implemented in the form of software and/or hardware in the vehicle assistance system 2.

In step S1, a camera image of the vehicle environment is continuously recorded. This can be carried out by the environment cameras 26.

In step S2, the camera images are analyzed in order to identify one or more specific environment objects or one or more specific environment regions. In particular, specific predefined environment objects/environment regions are intended to be identified and the contour of the object boundary and the internal structure of the surface of the environment object, i.e. the appearance of the object surface, and the position relative to a vehicle-fixed coordinate system are intended to be determined. The position can be determined in a manner known per se by using the plurality of environment cameras 26 or further capture systems, such as radar and lidar. Environment objects of interest can be specified, for example, as target objects of a navigation algorithm, such as charging stations, traffic signs or the like.

One or more of the specific environment objects can be highlighted in step S3 by using a blur effect, such as a frosted glass effect. Whereas environment objects of interest should not be blurred as far as possible by the blur effect, other environment objects or the environment region surrounding the environment object in the perception of the wearer of the smart glasses 3 can be specifically excluded from the perception by the driver or its perceptibility can be reduced by blurring. This makes it possible to direct the driver's focus to the non-blurred and thus clearly perceptible environment regions within the perception region, in which environment objects or environment regions insignificant to the driver and the vehicle would otherwise be perceived through the lenses of the smart glasses 3 (perception regions). Furthermore, interior devices of the vehicle can be identified as objects of no interest, with the result that, when they reach the driver's perception region, they can also be blurred by the blur effect.

Object information indicating the region of the blurring based on corresponding positions relative to the environmental coordinate system is generated in step S4. In other words, the vehicle assistance system 2 generates corresponding object information for transmission to the smart glasses 3 from the regions which are determined in step S3 and in which the wearer of the smart glasses 3 is intended to perceive environment objects only in a blurred manner, i.e. regions outside of environment objects of interest. The object information includes a display region, along with its position and contour, in which the blur effect is applied to the environment objects perceptible there or the environment region perceptible there.

The blur effect, such as the frosted glass effect, uses a blur to trace the contour and the internal structures of the environment region or environment objects, with the result that corresponding edges and high-contrast locations are accordingly perceived in blurred form. This can be effected by adding bright pixels.

The display object generated by the object information is then presented in a contact-analog manner in the smart glasses 3 in step S5. This means that, if a driver sees an environment object of interest or an identified environment object in their perception region, the environment regions defined by the object information (e.g. surrounding the corresponding environment object) can be blurred by the blur effect/frosted glass effect, with the result that the corresponding, non-blurred environment object becomes apparent in the perception. In this way, specific environment objects can be highlighted in a special way.

Provision may be made for the blur effect or frosted glass effect to only be able to be applied when the vehicle is at a standstill, since otherwise potentially driving-related and vehicle-related environment objects will be blurred, which may affect the safety of vehicle occupants and other road users. The blur effect or the frosted glass effect can also be cyclically switched on and off, e.g. with a cycle period of between 0.2 and 2 seconds, with the result that environment objects that are intended to be blurred can also be clearly perceived in short periods of time, and so the wearer of the smart glasses 3 also perceives them.

Figure 4:
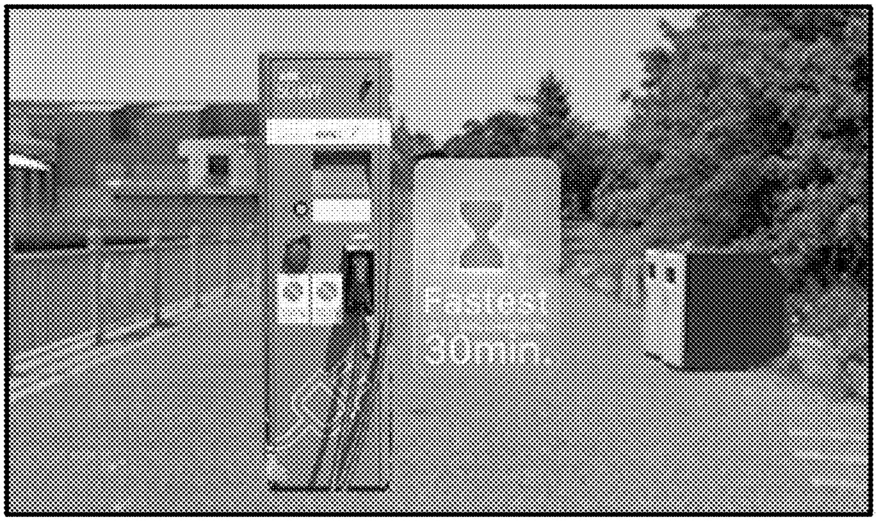
FIG. 4 shows an exemplary illustration of a display image in smart glasses with an environment region highlighted by the blur effect and a presentation of information above a blurred region.

FIG. 4 illustrates, for example, the application of a blur effect or a frosted glass effect to an environment region or an environment object in a field of view of the driver. An environment region blurred using the blur effect in the vehicle environment can be seen.

In addition to a specific environment object, for example a charging column, the blur effect can be used to blur a specific, for example rectangular, region and to present clear, non-blurred information above it, such as text, symbols or the like. As a result, information presented in this way is more perceptible than information presented directly above the real environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Vehicle
2 Vehicle assistance system
3 Smart glasses
4 Communication connection
21 Interior camera
23 Communication unit
24 Control unit
25 Environment capture system
26 Environment camera
31 Frame
32 Lens
33 Glasses temples
35 Display surface
36 Display device
37 Control unit
38 Glasses motion sensor system
39 Communication device

What is claimed is:

1. A method for operating a display system for smart glasses in a vehicle, the method comprising:

determining an environment region to be blurred by the smart glasses, wherein the environment region is in a vehicle surroundings and is determined by an vehicle assistance system of the vehicle;

generating, by the vehicle assistance system, object information that defines a blur object to be displayed by the smart glasses as virtually superimposed on the environment region within the perception of a wearer of the smart glasses; and transmitting the object information from the vehicle assistance system to the smart glasses, wherein the object information is received in the smart glasses in order to present the blur object in the smart glasses in a contact-analog manner, thus generating, within the perception of the wearer of the smart glasses covered by the blur object, the impression of a blurring of the real environment that is augmented with the blur object.

2. The method of claim 1, wherein the environment region comprises a region which is beside an environment object to be highlighted or at least partially surrounds an environment object to be highlighted.

3. The method of claim 2, wherein the environment object to be highlighted is identified and located by means of an environment capture system.

4. The method of claim 1, wherein the environment region comprises a predefined display region which is intended to be used to present display information.

5. The method of claim 1, wherein the object information is only generated when the vehicle is at a standstill.

6. An apparatus for operating a display system for smart glasses in a vehicle, the apparatus configured to:

determine an environment region to be blurred by the smart glasses, wherein the environment region is in a vehicle surroundings;

generate object information that that defines a blur object to be displayed by the smart glasses as virtually superimposed on the environment region within the perception of a wearer of the smart glasses; and transmit the object information to the smart glasses, wherein the object information is receivable in the smart glasses so as to present the blur object in the smart glasses in a contact-analog manner, thus generating, within the perception of the wearer of the smart glasses covered by the blur object, the impression of a blurring of the real environment that is augmented with the blur object.

7. A display system, comprising:

the apparatus of claim 6; and smart glasses configured to display the blur object in a contact-analog manner based on a pose of the head of the wearer of the smart glasses.

8. A method for operating a display system for smart glasses in a vehicle, the method comprising:

determining an environment region to be blurred by the smart glasses, wherein the environment region is in a vehicle surroundings and is determined by an vehicle assistance system of the vehicle;

generating, by the vehicle assistance system, object information that defines a blur object to be displayed by the smart glasses as virtually superimposed on the environment region within the perception of a wearer of the smart glasses; and transmitting the object information from the vehicle assistance system to the smart glasses, wherein the blur object is generated by adding pixels in the image of the environment region to be blurred, by means of which the perception of structures in the image of the specific environment region and the outer contour of the environment region are blurred, and/or by modifying the image of the environment region by means of a graphics filter that applies sharpness, structure and color and/or image effects to the image of the environment region.

9. The method of claim 8, wherein the environment region comprises a region which is beside an environment object to be highlighted or at least partially surrounds an environment object to be highlighted.

10. The method of claim 9, wherein the environment object to be highlighted is identified and located by means of an environment capture system.

11. The method of claim 8, wherein the environment region comprises a predefined display region which is intended to be used to present display information.

12. The method of claim 8, wherein the object information is only generated when the vehicle is at a standstill.

* * * * *